(12) United States Patent
Graham et al.

(10) Patent No.: US 7,887,863 B2
(45) Date of Patent: Feb. 15, 2011

(54) METHOD FOR MAKING A CUBED NUT CLUSTER

(75) Inventors: David Wallice Graham, Carrolton, TX (US); Carol McCall, McKinney, TX (US); Mohan Rao, Plano, TX (US); Scott Sullivan, Frisco, TX (US)

(73) Assignee: Frito-Lay North America, Inc., Plano, TX (US)

( * ) Notice: Subject to any disclaimer, the term of this patent is extended or adjusted under 35 U.S.C. 154(b) by 1074 days.

(21) Appl. No.: 11/553,694

(22) Filed: Oct. 27, 2006

(65) Prior Publication Data

US 2008/0102171 A1     May 1, 2008

(51) Int. Cl.
    *A23L 1/10*      (2006.01)

(52) U.S. Cl. .................. 426/274; 426/518; 426/632; 426/660; 426/629; 426/512

(58) Field of Classification Search ................ 426/518, 426/629, 632, 660, 89, 517, 274, 309, 639, 426/512, 519–520; 118/104
See application file for complete search history.

(56) References Cited

U.S. PATENT DOCUMENTS

| | | | |
|---|---|---|---|
| 3,009,427 A | 11/1961 | Bell | |
| 3,548,758 A * | 12/1970 | Singer | 83/155 |
| 4,000,321 A | 12/1976 | Mochizuki et al. | |
| 4,010,284 A | 3/1977 | Bellew | |
| 4,098,914 A * | 7/1978 | Knechtel | 426/632 |
| 6,200,611 B1 * | 3/2001 | Ganesan et al. | 426/93 |
| 6,340,490 B1 | 1/2002 | Owens | |
| 2005/0042357 A1 | 2/2005 | Mesu et al. | |
| 2005/0129817 A1 | 6/2005 | Malecha et al. | |

FOREIGN PATENT DOCUMENTS

| | | |
|---|---|---|
| EP | 0694261 B1 | 1/1996 |
| FR | 2863455 A1 | 6/2005 |
| RU | 2229236 C1 | 5/2004 |
| RU | 2238656 C2 | 10/2004 |

OTHER PUBLICATIONS

English Translation FR2863455; p. 1-3, published Jun. 17, 2005.*
Ridderbusch, Gerhard "Forming of Coated and Uncoated Cereal Bars," Confectionery Production, Dec. 1985, pp. 686, 688, and 690.
"Konfety" (Candies-Eng.), M., "Pischevaya Promyshlennost" (Food Industry—Eng.), 1979, pp. 239-242, cited in Russian Patent Application 2009110500 Office Action, translated in Baker & McKenzie letter dated Jul. 19, 2010 (9 pages).

* cited by examiner

*Primary Examiner*—Drew E Becker
*Assistant Examiner*—Steven Leff
(74) *Attorney, Agent, or Firm*—Bobby W. Braxton; Colin P. Cahoon; Carstens & Cahoon, LLP

(57) ABSTRACT

A method for creating hexahedron or cubed nut cluster having a high level of nuts or seeds. The invention is an improved process for manipulating and shaping high content nut and seed food products. In one aspect, the invention manipulates processing conditions to provide a nut slab high nut content nut slab that is conducive to slicing and cutting. In one aspect, the invention manipulates unit operation conditions so as to provide a method of slicing a high content nut slab into longitudinal strips in a continuous operation that minimizes or eliminates jamming at the cutting and/or stabbing conveyors.

12 Claims, 3 Drawing Sheets

METHOD FOR MAKING A CUBED NUT CLUSTER

BACKGROUND OF THE INVENTION

1. Technical Field

The present invention is directed towards a method for making a shaped nut cluster and more particularly to a method for making a plurality of nut-cluster hexahedrons and cubes.

2. Description of the Related Art

Snack foods are popular and convenient foods. In recent years, consumer demand has been dramatically increasing for healthy foods in general, and healthy snack foods in particular. Nuts and seeds are healthy, natural food products, but lack the sweet flavor that consumers demand. One prior art solution to providing a nut-based snack food is peanut brittle. Peanut brittle is typically made by mixing 40% to 60% raw nuts by weight with a binder solution. For example, U.S. Pat. No. 6,074,684 discloses a peanut brittle having 8 parts of peanuts to 6 parts of corn syrup and 4 parts of peanut butter to 3 parts of corn syrup by volume. Thus, before the peanut butter is added, which dilutes the amount of raw peanuts, the mixture has less than 60% by weight peanuts. Many consumers, however, are demanding even higher levels of natural food products in their snack foods. Unfortunately, it is difficult to make peanut brittle-like clusters at higher nut contents because it is difficult to form and cut the resultant mixture into squares on a commercial scale. As a result, as illustrated by U.S. Pat. No. 4,010,284, many nut clusters are simply made into irregularly shaped free formed clusters. Consequently, a need exists for a method for making a plurality of nut cluster cubes with a high nut content on a commercial scale.

SUMMARY OF THE INVENTION

The present invention is directed towards a method for making a plurality of high-nut content hexahedron-shaped clusters comprising the steps of admixing a raw food material with a binder syrup into a nut mixture such that said nut mixture comprises about 60% to about 85% of said raw material, placing said nut mixture having a controlled slab temperature on a slab conveyor moving in a longitudinal direction, compressing said nut mixture to make a nut slab with at least one compression roller, using at least one rotary slitter that comprises a rotational speed greater than a slab speed to simultaneously pull and slice said nut slab into longitudinal strips, and cutting said longitudinal strips in the transverse direction to form a plurality of hexahedron-shaped nut clusters.

In one aspect of the invention, the pliability of the slab is carefully controlled by adjusting the slab temperature. In one aspect, the cutting angle of the slitter is adjusted to reduce pressure at the slitter and facilitate slab movement through the slitter. In one aspect, the rotational speed of the slitter is adjusted relative to the slab speed to facilitate slab movement through the slitter. These as well as additional features and advantages of the present invention will become apparent in the following written Detailed Description.

BRIEF DESCRIPTION OF THE DRAWINGS

The novel features believed characteristic of the invention are set forth in the appended claims. The invention itself however, as well as a preferred mode of use, further objectives and advantages thereof will be best understood by reference to the following detailed description of illustrative embodiments when read in conjunction with the accompanying drawings, wherein:

FIG. 3b is a partial end view of FIG. 3a; and

DETAILED DESCRIPTION

Figure 1:
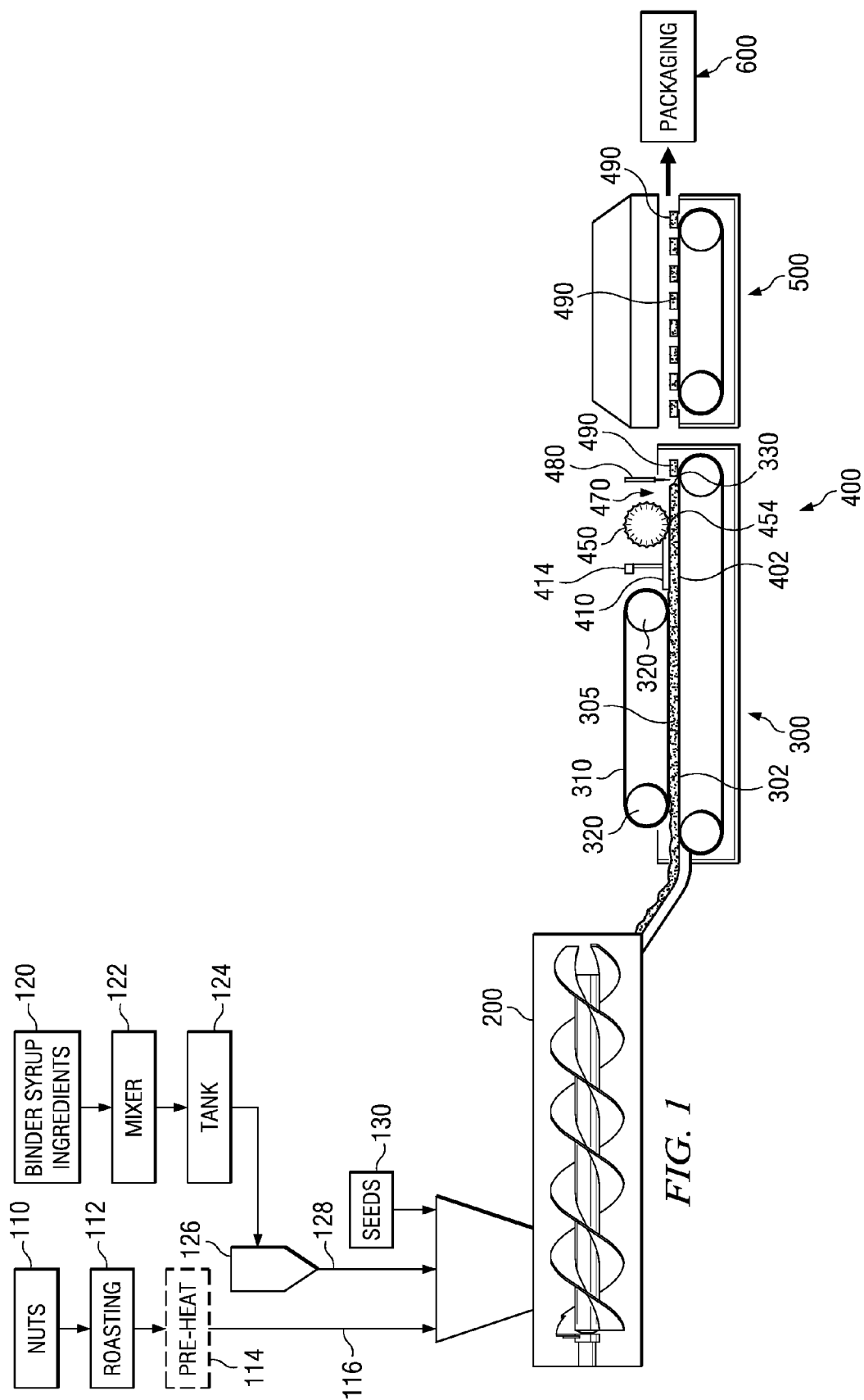
FIG. 1 is a schematic indicating the processing steps for the present invention.

The hexahedron-shaped nut clusters of the present invention are prepared using nuts and a binder syrup. As used herein, the term "hexahedron-shaped nut cluster" is defined as a shaped nut-cluster having six sides and encompasses cubes and quadrates having sides with equal or unequal areas. FIG. 1 is a flowchart indicating the processing steps for the present invention. In one embodiment, nuts 110, binder syrup 128, and optionally seeds 130 at an elevated temperature, defined as a temperature above ambient, are placed into a continuous mixer 200 which extrudes the mixture onto a slabbing conveyor 300 where the mixture is compressed and cut into nut cubes on the cutting conveyor 400. The nut cubes are then routed to a cooling conveyor 500 and are then routed to packaging 600.

The mixture, consisting of all process streams 116 128 130 entering the mixer 200 preferably comprises between about 60% and about 85% and more preferably between about 65% and about 85% and most preferably between about 77% and about 82% of raw food material by weight of the total mixture entering the mixer 200. As used herein, "raw food material" is defined as raw or roasted nuts or seeds. In one embodiment, whole nuts or seeds are used as opposed to chopped or cut nuts or seeds. The nuts used in the present invention can be selected from one or more nuts including, but not limited to, peanuts, cashews, almonds, walnut, pecan, chestnut, macadamia, pistachio, hazelnuts/filberts, brazil nuts and pine nuts. Further, the seeds used in this invention can be selected from one or more seeds including, but not limited to, sesame seeds, sunflower seeds, pumpkin seeds, flax seed, poppy seeds, and squash seeds. In one embodiment, the raw food material comprises about 1% to about 20% seeds. The combinations and ratios of nuts to seeds is specific to the nuts used, and optimized for consumer preferences, considering processability, supply and economics. As used herein, "nut mixture" is defined as a raw food material that has been admixed with a binder syrup and the term nut mixture is intended to encompass raw food mixtures having only seeds and no nuts admixed with a binder syrup as well as raw food mixtures having only nuts and no seeds admixed with a binder syrup.

In one embodiment nuts are roasted 112 in an oven operating at an oven temperature of between about 250° F. and about 300° F. and more preferably between about 265° F. and about 280° F. for between about 5 and about 15 minutes and more preferably for about 10 minutes. In one embodiment, nuts having a native moisture content of between about 3% and about 7% by weight are roasted 112 to a moisture content of about 0.5% to about 4% by weight and most preferably about 2% moisture by weight. The nuts, having an elevated temperature, can then be added directly to the mixer 200.

In an alternative embodiment, pre-roasted nuts can be used. If nuts 116 at ambient temperature are mixed with the binder syrup 128 having an elevated temperature leaving the evaporator 126 in the mixer 200, the nuts 116 may quickly lower the temperature of the syrup, the syrup may not flow properly and proper mixing and coverage of the binder syrup and the nuts or seeds may not occur. Consequently, if pre-roasted nuts or unroasted nuts are used it is preferred that the nuts be pre-heated 114 to a nut temperature that is sufficient to prevent substantial cooling of the nut mixture in the mixer 200. In one embodiment, the nuts 116 entering the mixer 200 comprise an elevated nut temperature of between about 180° F. and about 200° F. In one embodiment, the temperature of the nut mixture in the mixer is between about 200° F. and about 250° F. and more preferably between about 21° F. and about 240° F. and most preferably between about 220° F. and about 235° F.

The composition of binder syrup ingredients 120 for one formulation is shown in Table 1. In addition, various acceptable ranges of binder syrup ingredients 120 are also shown. As indicated below, binder syrup ingredients comprise a base syrup such as corn syrup, brown rice syrup or rice malt, or honey; a sugar such as evaporated cane juice or sucrose, optionally sea salt, and optionally water. Artificial sweeteners and sugar alcohols can also be used.

TABLE 1

Ingredients for Binder Syrup For a Nut Cluster

| Ingredient | Formula wt. % | Range % |
|---|---|---|
| Base Syrup | 62% | 40–70% |
| Sugar | 34% | 10–50% |
| Sea Salt | 2% | 0–10% |
| Water | 2% | 0–5% |

In one embodiment, the binder syrup ingredients are mixed in a syrup batch mixing tank 122 or other suitable mixer and heated to an elevated temperature. The elevated temperature should be sufficiently high to solubilize the sugars, but not so high as to induce carmelization of the sugar. Elevated temperatures can also impact viscosity and texture characteristics of the sugars in the binder syrup. In one embodiment, a binder syrup ingredient temperature of between about 170° F. and about 200° F. and more preferably between about 175° F. and about 185° F. is sufficient. In one embodiment, the binder syrup ingredient mixture in the mixer 122 comprises a brix of about 76°. The binder syrup ingredient mixture can then be routed to a continuous syrup use tank 124 where the elevated temperature of the binder syrup is maintained. The continuous syrup use tank 124 permits the process to be run in a continuous fashion by accepting batches from the mixer 122 while continuously pumping the binder syrup ingredient mixture to the evaporator 126. The evaporator 126 removes the moisture to make a binder syrup 128. The amount of heat input into the evaporator 126 can be adjusted such that the exit temperature of the binder syrup 128 is between about 240° F. and about 290° F. and more preferably between about 250° F. and about 280° F. and most preferably about 255° F. to about 275° F. At higher binder syrup 128 exit temperatures of about 280° F. and about 290° F. the viscosity of the syrup is high and begins to approach a threshold temperature where caramelization and scorching of the sugars in the binder syrup can occur. At temperatures lower than about 240° F., there is too much moisture in the binder syrup 128 and the finished product will be very chewy and sticky and processing at the slitter 450 becomes difficult. The temperature range of the binder syrup 128 exiting the evaporator 126 is also important to permit a relatively low mass of binder syrup 128 to effectively bind a relatively high mass of nuts/seeds together. Because the evaporator 126 removes most of the water, the binder syrup 128 exiting the evaporator 126 comprises a moisture content less than about 5% and preferably between about 1% and about 3% and most preferably about 2%. The nuts and/or seeds and the binder syrup is then routed into a heated continuous mixer such as a low shear single screw former 200 to form a nut mixture. The composition of the resultant nut mixture for one formulation is shown in Table 2. In addition, various acceptable ingredients in ranges are presented as well.

TABLE 2

Ingredients for Nut Cluster

| Ingredient | Formula wt. % | Range wt. % |
|---|---|---|
| Nuts | 76% | 0%–90% |
| Seeds | 2% | 0%–90% |
| Brown Rice Syrup | 14% | 0–20% |
| Evaporated Cane Juice | 7% | 0–20% |
| Sea Salt | 0.5% | 0–3% |
| Water | 0.5% | 0–3% |

The nut mixture at this point is transferred onto a slabbing conveyor 300 where the mixture is compressed between a lower endless steel belt 302 and an upper endless cotton belt 310 surrounding a plurality of compression or tamping rollers 320. The nut mixture is compressed to a slab thickness 330 of between about ½-inch and about 1-inch and more preferably of between about ⅝-inches and about ¾ inches and most preferably about 0.7 inches for a cube-shaped embodiment. The nut mixture partially cools as it is rolled out. The nut mixture must be at a temperature such that the resultant nut slab is set up enough that it is sufficiently rigid to maintain shape while the nut slab it is being slit and cut, yet not too pliable. If the nut slab is too pliable, the slab becomes difficult to cut resulting in undesirable backpressure. The backpressure causes the slab to move back on itself which can cause jamming at the slabbing and cutting conveyors. If the nut slab is too hard, on the other hand, it becomes too difficult to slit. In one embodiment, the temperature of the slabbing conveyor 300 is controlled by a water bath adjacent to the lower stainless steel belt 302 and ensures a controlled slab temperature just prior to cutting by the rotary slitter 450 of between about 120° F. and about 180° F. and more preferably between about 135° F. and about 145° F. The nut slab is next routed to a cutting station 400 where the nut slab is sliced in the longitudinal direction by a rotary slitter 450 to divide the continuous slab into continuous longitudinal strips or multiple lanes of product.

Figure 2:
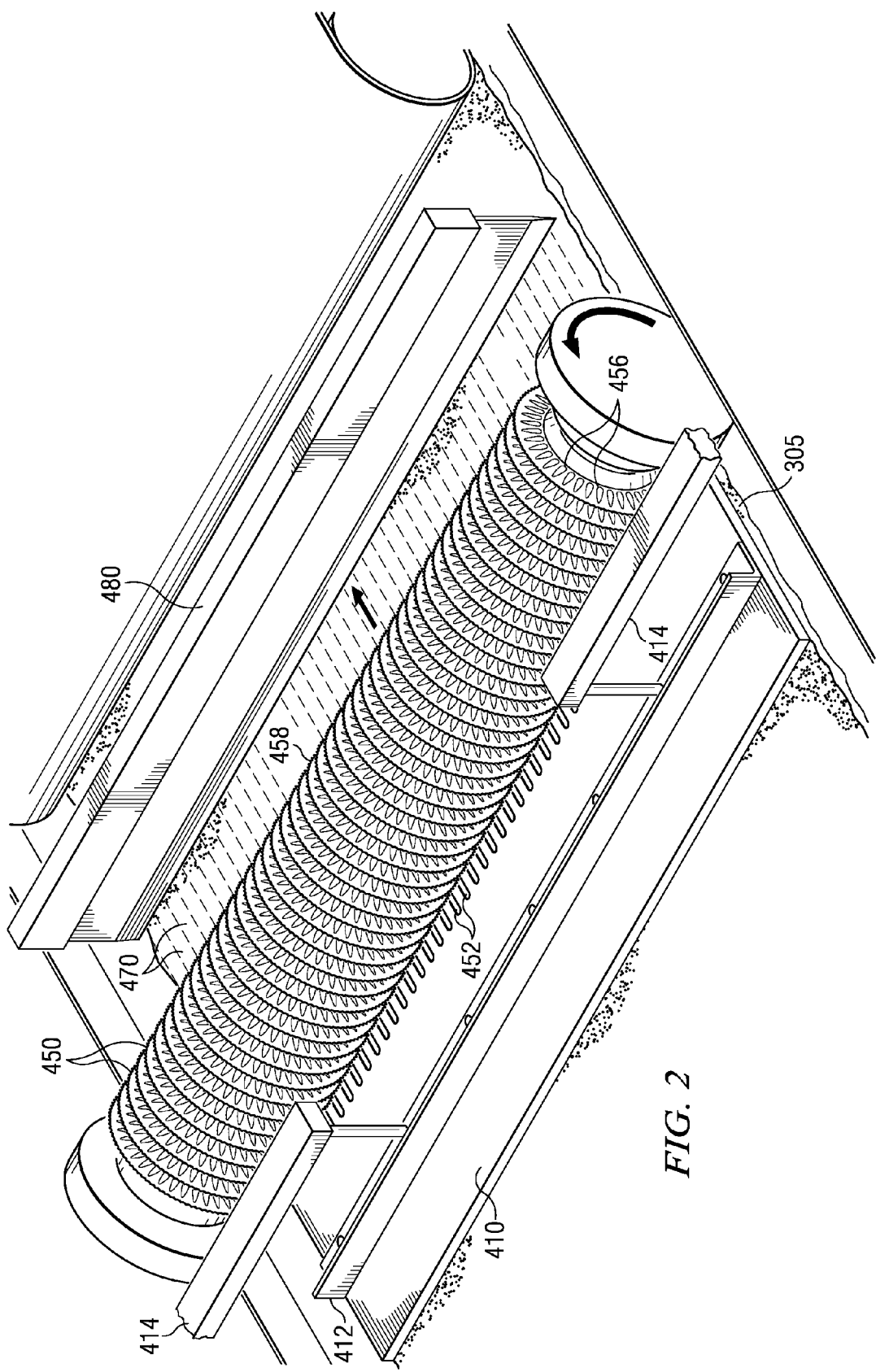
FIG. 2 is a perspective view of a portion of the cutting station in accordance with one embodiment of the present invention.

FIG. 2 is a perspective view of a portion of the cutting station 400 in accordance with one embodiment of the present invention. When used in the Figures, the same numerals designate the same or similar parts. Referring to FIGS. 1 and 2, a plate 410 is used upstream of the slitter to help guide the slab 305 and keep it from buckling as a result of backpressure at the slitter 450. The plate 410 can be held in place by a transverse or other suitable support bar 412 that is held in place by a suitable mounting member 414. In one embodiment, the plate 410 comprises an expanded ultra high molecular weight polyethylene (EUHMWPE), or other non-stick coated metal. As shown in FIG. 2 multiple slitters 450 can be placed in parallel across the width of the slab spaced apart as desired to produce multiple longitudinal strips 470. In one embodiment, the plate 410 optionally surrounds at least a portion of the slitter blade by providing a channel 452 in spaced relation to a slitter 450 to permit the slitter to engage the slab 305. In one embodiment, the rotary slitters 450 are spaced in parallel apart about 0.75 inches to cover the width of the band and produce longitudinal strips 470 of about 0.75 inches in width. Of course, these numbers are purely for purposes of illustration and not limitation.

Slitting a high nut content slab so as to provide a clean, effective cut to reduce waste while keeping the product in a forward motion is very difficult. This can be especially true if whole nuts or seeds are used. As discussed above, one important factor to ensure proper pliability of the slab is that the slab temperature must be carefully controlled. Additionally, in one embodiment, the design of the slitter also plays an important role in providing a clean effective longitudinal cut. Consequently, a rotary slitter having a plurality of serrated blades about the outer circumference 458 can be used in accordance with one or more embodiments of the present invention.

Figure 3A:
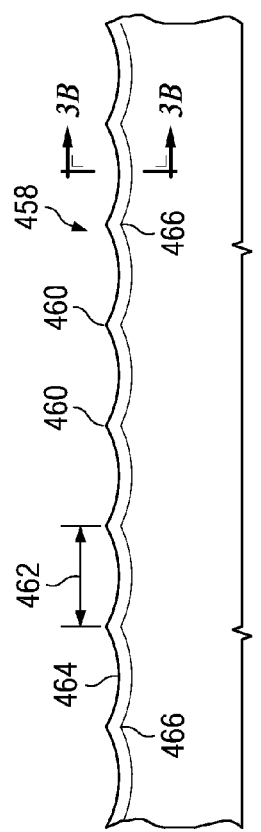
FIG. 3a is an expanded linearized partial cross-sectional view of the outer circumference of the slitter in accordance with one embodiment of the present invention.

FIG. 3a is an expanded partial cross-sectional, linearized view of the outer circumference 458 of the slitter in accordance with one embodiment of the present invention. In one embodiment, the serrated or scalloped blade comprises a plurality of high points 460 about the outer circumference 458. In one embodiment, the high points 460 are separated by an arcuate trough 464 having a radius of curvature of between about 1/10 inches and about 1/4 inches and more preferably about 1/8 inches. In one embodiment, the distance 462 between the high points 460 is between about 1/10 inches and about 1/4 inches and more preferably about 1/8 inches. In one embodiment, the arcuate trough 464 comprises an amplitude of between about 0.010 and about 0.020 and more preferably about 0.015 inches.

Figure 3B:
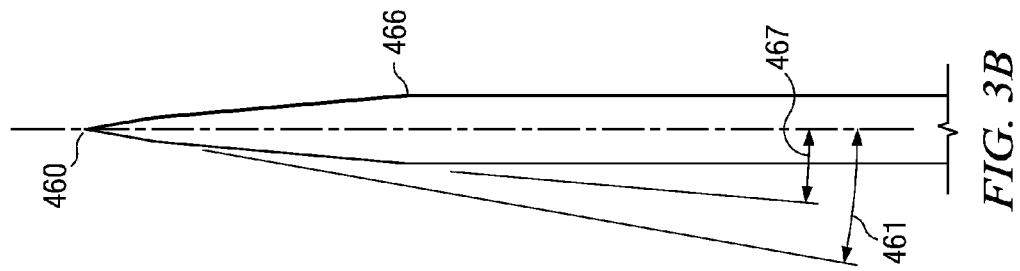

FIG. 3b is a partial end view of FIG. 3a. In one embodiment, the bottom tip 466 of the scallop comprises a bottom angle 467 of between about 0 and about 10 degrees from vertical and more preferably comprises a bottom angle 467 of about 5 degrees.

In one embodiment, the high point 460 comprises a high point angle 461 of between about 0 degrees and about 20 degrees and more preferably about 10 degrees. In one embodiment, the slitter comprises about 450 high points 460 about the outer circumference 458. Again such number is provided purely for purposes of illustration.

In one embodiment, a single rotary slitter 450 in series can be utilized, as depicted in FIG. 1 to provide the longitudinal cut to the nut slab. In one embodiment, the rotary slitter 450 station comprises two or more slitters in series. For example, a first slitter in series following the slabbing conveyor perforates a portion of the slab, e.g., between about 25% and about 75% and more preferably about 50% of the slab thickness and a second slitter finishes the slit and nearly contacting or contacting the lower conveyor belt 402.

In one embodiment, the outer circumference 458 of the rotary slitter 450 rotates a speed sufficient such that the slitter exerts a pulling motion on the slab and ensures the slab continues to move in the forward direction (e.g. left to right as depicted in FIG. 1). Consequently, in one embodiment, the slitter comprises a rotational speed greater than the slab speed. In one embodiment, the slitter simultaneously pulls and slices the nut slab into longitudinal strips.

In one embodiment, the slab adhesion to the upper belt and/or the lower belt is increased, e.g. the upper or lower belt is made stickier to help prevent the slab from sliding backwards. Either or both belts can be made stickier by coating the belts with binder syrup.

In one embodiment, the slitter comprises a diameter sized so as to provide a cutting angle that provides a clean, effective cut. In one embodiment, the slitter comprises a diameter of between about 5 and about 30 inches and more preferably between about 8 inches and about 10 inches.

In one embodiment, the slitter 450 comprises a plurality of indentations 456 to a clean, effective cut minimize the fines. In one embodiment, the slitter 450 comprises an electrolysis nickel coating to minimize sticking to the nut slab 305.

In one embodiment, the rotary slitter comprises a blade gap 454 of less than about 0.3 inches and in one embodiment less than about 0.03 inches. Such blade gap 454 advantageously provides a longitudinal cut while minimizing backpressure.

Referring back to FIG. 2, the longitudinal strips 470 are then cut into hexahedron-shaped nut clusters 490 by a guillotine cutter 480 or other suitable cutter cutting in the transverse direction. In one embodiment (not shown), a rotary cutter cutting in the transverse direction can be used in place of the guillotine cutter. Such embodiment can provide a trapezoidal type hexahedron shaped nut cluster. The nut clusters are cooled 500 to less than about 100° F. or ambient temperature by methods well known in the art and sent to a packaging step 600.

Figure 4:
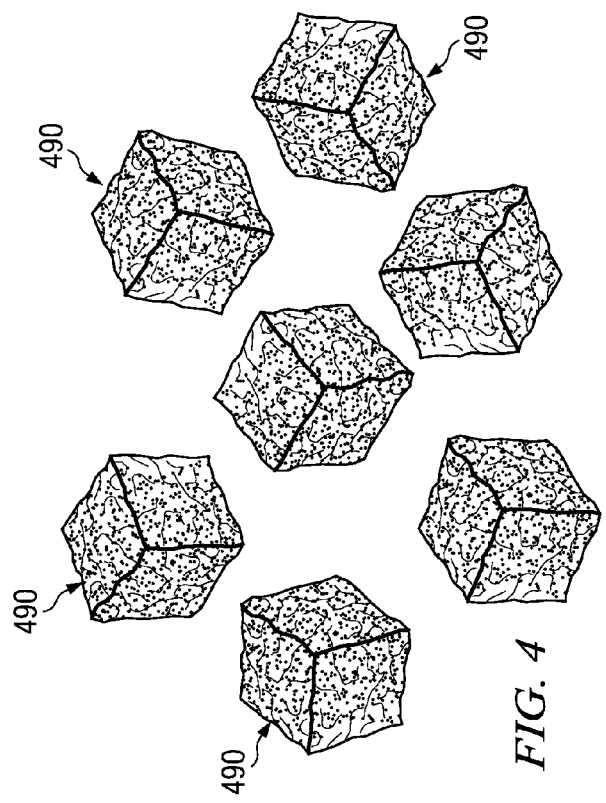
FIG. 4 is a perspective view of a nut cluster made in accordance with one embodiment of the present invention.

FIG. 4 is a perspective view of a high nut content cubed nut cluster 490 made in accordance with one embodiment of the invention. As shown, the nut cluster comprises well-defined edges resembling a cube and also whole, rather than crushed nuts.

EXAMPLE

Binder syrup ingredients comprising about 640 pounds of brown rice syrup, about 347 pounds of evaporated can juice, about 196 pounds of water and about 29 pounds of sea salt were mixed together and heated to about 180° F. in a syrup batch mixing tank. The binder syrup ingredients were transferred to a continuous syrup use tank where the temperature of about 180° F. was maintained. The binder syrup ingredients were then pumped to an evaporator where the moisture was removed thereby producing about 250 pounds of binder syrup having a solids content of about 98%. An evaporator available from a manufacturer such as Design Tools and Gauges of Birkenhead, England can be used. This binder syrup was fed into the feed hopper of a steam jacketed continuous mixer.

Nuts, previously roasted at oven temperature of about 270° F. for about 12 minutes in a Nut Roaster available from Wolverwine, Proctor and Schwartz, of Merrimac, Massachussetts. The roasted nuts were then fed to a pre-heater at a nut temperature of about 200° F. at a rate of about 975 pounds per hour and then fed into the hopper with the about 250 pounds per hour of binder syrup and about 25 pounds per hour of sesame seeds and the ingredients were mixed together in the continuous mixer to make a nut mixture. Pre-heaters and evaporators available from available from a manufacturer such as Design Tools and Gauges of Birkenhead, England can be used The nut mixture was then transferred onto a slabbing conveyor where about 1200 pounds per hour of the nut mixture was made into a nut slab having a width of about 35 inches and having a thickness of about 0.7 inches (18 mm) where it cooled to a temperature of about 140° F. Slabbing conveyors can be obtained from manufacturers such as Sandvik Process Systems of Totowa, N.J. The nut slab moving at a line speed of about 12 feet per minute was then slit into 35 longitudinal strips having about 3/4-inch widths by 50 slitters operating in parallel. Each slitter comprised an outer diameter of about 9 inches and independently rotated at a speed of about 170 RPM to ensure the slitter exerted a pulling force in the forward direction on the slab. A transverse cut made by a guillotine cutter operating at about 192 cuts per minute made a plurality of nut cubes, each nut cube weighing about 4.5 grams and having a longitudinal length of about 0.75 inches, a height of about 0.7 inches and a width of about 0.75 inches. Thus, in accordance with one embodiment, the present invention is able to manufacture large scale quantities, e.g., about 1200 pounds per hour of a bite-sized nut cluster cube.

There are numerous advantages provided by the instant invention. First, the instant invention discloses a novel method for making a cubed, high content nut cluster. The invention provides a novel way to cut a high nut content mixture. Finally, the instant invention provides a method for economically making large quantities of a cubed, high content nut clusters whereby the nuts maintain their traditional and expected texture, appearance and flavor.

While the invention has been particularly shown and described with reference to a preferred embodiment, it will be understood by those skilled in the art that various changes in form and detail may be made therein without departing from the spirit and scope of the invention. For example, the dimensions may be changed to increase or decrease the overall size of the nut pieces; the shapes of the nut pieces may be changed; and the nut piece composition may be varied to adjust the texture and flavor of the final product, and to accommodate various flavor combinations and/or inclusions. Further, the means for cutting the product need not be one particular type, but could include any number of commonly available cutting devices. Different thicknesses of the final product may be desired. The overall intent of this invention is to create a cube shaped nut-cluster having a high nut content that can be manufactured in an efficient manner.

We claim:

1. A method for making a plurality of hexahedron-shaped nut clusters, said method comprising the steps of:
    a) admixing a raw food material with a binder syrup into a nut mixture such that said nut mixture comprises between about 60% to about 85% of said raw food material;
    b) placing said nut mixture having a controlled slab temperature on a slab conveyor moving in a longitudinal direction;
    c) compressing said nut mixture to make a nut slab with at least one compression roller;
    d) using at least one rotary slitter that comprises a rotational speed greater than a slab speed to simultaneously pull and slice said nut slab into longitudinal strips; and
    e) cutting said longitudinal strips in the transverse direction to form a plurality of hexahedron-shaped nut clusters.

2. The method of claim 1 wherein said controlled slab temperature at step b) is between about 120° F. and about 180° F.

3. The method of claim 2 wherein said controlled temperature at step b) is between about 135° F. and about 145° F.

4. The method of claim 1 further comprising the step of providing a plate upstream of the slitter.

5. The method of claim 1 wherein said rotary slitter at step d) comprises a plurality of serrated edges about an outer circumference of said slitter.

6. The method of claim 1 wherein said rotary slitter at step d) comprises a blade gap of less than about 0.03 inches.

7. The method of claim 1 wherein said rotary slitter at step d) comprises a diameter of between about 8 and about 10 inches.

8. The method of claim 1 further comprising a first rotary slitter and a second rotary slitter in a series.

9. The method of claim 1 wherein said compressing at step c) occurs with an upper belt and a lower belt and wherein said upper belt or said lower belt comprises a substance to enhance slab adhesion to at least one of said belts.

10. The method of claim 9 wherein said substance comprises binder syrup.

11. The method of claim 1 wherein said raw food material at step a) comprises whole nuts or seeds.

12. The method of claim 1 wherein said raw food material further comprises between about 1% and about 20% seeds.

* * * * *